May 27, 1969 D. W. LOGAN 3,446,521

PILOT'S LOG

Filed Feb. 7, 1967 Sheet 1 of 2

Douglas W. Logan

INVENTOR.

BY Clarence A. O'Brien and Harvey B. Jacobson Attorneys

Douglas W. Logan
INVENTOR.

BY Clarence A. O'Brien
and Harvey B. Jacobson
Attorneys

United States Patent Office 3,446,521
Patented May 27, 1969

3,446,521
PILOT'S LOG

Douglas W. Logan, 206 E. Franklin, Weatherford, Okla. 73096

Filed Feb. 7, 1967, Ser. No. 614,465
Int. Cl. B42d *15/00*; B64d *47/00*
U.S. Cl. 283—62 1 Claim

ABSTRACT OF THE DISCLOSURE

An information presenting flight log comprising a plurality of hingedly interconnected vertically elongated sections which enable the selective disclosure of information, for example the current leg of a flight. The log incorporates means for presenting a visual indication of the significance of the information both so as to facilitate the recording of the information and a review of the information.

The present invention relates to new and useful improvements in pilot or flight logs, and is more specifically concerned with the provision of a log which constitutes a significant and highly advantageous departure from the conventional log.

As will be appreciated, the conventional log combines a series of horizontal rows and vertical columns arranged generally in the nature of a ledger or the like wherein both a horizontal and a vertical reading is required for both a recordation and a reading of the information desired. Such logs, in addition to being relatively cumbersome because of the large size thereof, are difficult to read, and in fact are frequently misread. Accordingly, it is a primary object of the instant invention to provide a pilot's log wherein provision is made for both the recordation and reading of the desired information in a manner which eliminates any possibility of error arising from either a recording of the information in the wrong place or a reading of the information appearing in an other than the proper location for this particular information. Further, and along these same lines, it is a significant intention of the instant invention to provide a pilot's log wherein only the current leg of a flight will be in view with the required information associated therewith being presented vertically whereby the necessary recording of the information, including the required mathematics, can be effected in a normal manner vertically, thereby eliminating the necessity for performing horizontal mathematical computations as in the conventional log.

In addition, in avoiding another disadvantage present in the conventional type of log, it is a significant feature of the instant invention to provide a pilot's log which can be physically held or positioned during a recordation or reading of the information without either discomfort or difficulty. As an example, the log can be mounted directly on the instrument panel through the utilization of any type of appropriate clips with the narrow vertically elongated nature of the log allowing for a positioning thereof between the dials in a manner whereby an actual illumination of the log will be effected from the instrument panel lights, this in turn avoiding the necessity of the pilot attempting to focus a flashlight on the log while simultaneously recording or reading the information.

Furthermore, the log of the instant invention, when folded as it will be during the recordation or reading of the information, is of a size which can be easily slipped in one's pocket or held in one's hand, the rigid nature of the folded stiff paper or thin cardboard allowing it to be utilized without any backing or the like.

In connection with ensuring a proper recordation and reading of the desired information, it is an important object of the instant invention to provide those physical indications on each section of the log which directly relate to the particular information associated therewith.

Basically, in achieving the above objects, it is contemplated that the pilot or flight log of the instant invention be constructed of a sheet of light shape-sustaining cardboard or the like provided with vertical fold lines at equally spaced points thereacross so as to define a plurality of vertical sections which, through a selective folding of the log, can be exposed independent of the remaining sections. The majority of these sections are arranged so as to vertically present the information for a specific leg of the journey, with each leg section including means thereon specifically and visually indicating the two check points which define the leg, the compass heading, and the distance, in conjunction with other related information.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
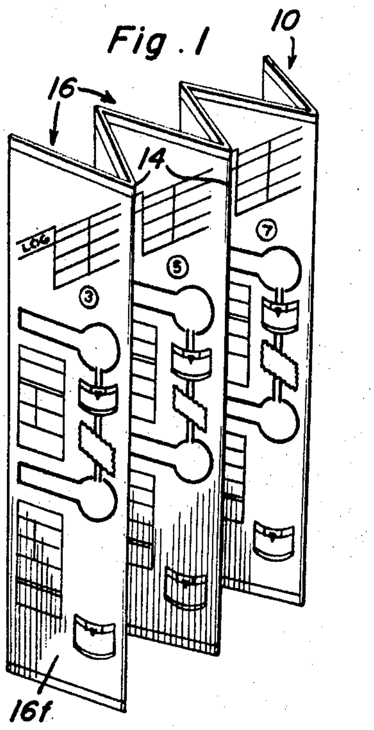
FIG. 1 is a perspective view of the pilot's log indicating the folding nature thereof.

Referring now more specifically to the drawings, reference numeral 10 is used to generally designate the pilot's or flight log comprising the instant invention. In the formation of the log 10, a rectangular sheet 12 of heavy paper or light cardboard is used with the sheet 12 being provided with a plurality of transversely extending equally spaced fold lines 14 extending completely thereacross. These fold lines 14 divide the sheet 12 into a series of integrally joined equal width parallel sections or strips 16. The fold lines 14 define flexible hinges or hingelike areas between the adjacent sections 16 for enabling a folding of each section 16 either forwardly or rearwardly relative to the adjacent sections, and by the same token so as to allow for, due to the generally flexible nature of the sheet 12 itself and through an appropriate folding of the sections 16 relative to each other, a reception between any two adjacent sections 16 of all of the remaining sections 16. This complete flexiblity achieved by the fold line hinge areas 14 allows for a selective exposure of either face of any of the sections 16 while completely concealing the remaining sections 16 therebehind. In this manner, a relatively narrow easily handled unit is provided wherein only selected information is disclosed with the remainder of the information benig temporarily concealed so as to avoid any possibility of confusion or misreading.

The ability to compact the log 10, in addition to providing for a selective disclosure of the information so as to avoid any question of confusion, enables the log 10 to be conveniently held in one hand as the information is being recorded or read, the inherent stiffness of the material of the sheet 12, especially when folded, allowing one to easily inscribe the information directly thereon. Further, noting FIG. 2 in particular, the narrow nature of the folded log 10, on which the information is vertically arranged as shall be explained in detail subsequently, enables the log 10 to be conveniently clipped or otherwise mounted directly on the instrument panel 18 of the aircraft 20. In this manner, the natural light from the instrument panel 18 itself will illuminate the log 10, avoiding the necessity of using a hand-held flashlight or other light source. Further, when it is desired to record information, the pilot need merely reach his hand forwardly and inscribe the desired information on the mounted log 10, the arrangement of the information receiving areas being such so as to facilitate the inscribing of the information onto the generally vertically mounted log 10. Another advantage of the compact nature of the log 10 is the fact that, when leaving the aircraft 20, the entire log can be easily slipped into a shirt pocket in order that it might be always conveniently available.

Figure 2:
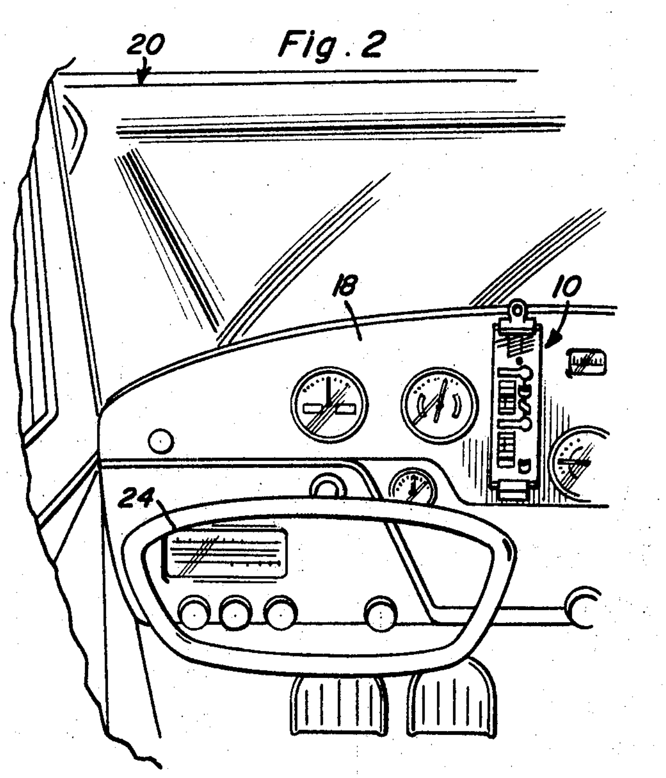
FIG. 2 is a view of the cockpit of an airplane illustrating one convenient manner of locating the log of the instant invention.
Figure 3:
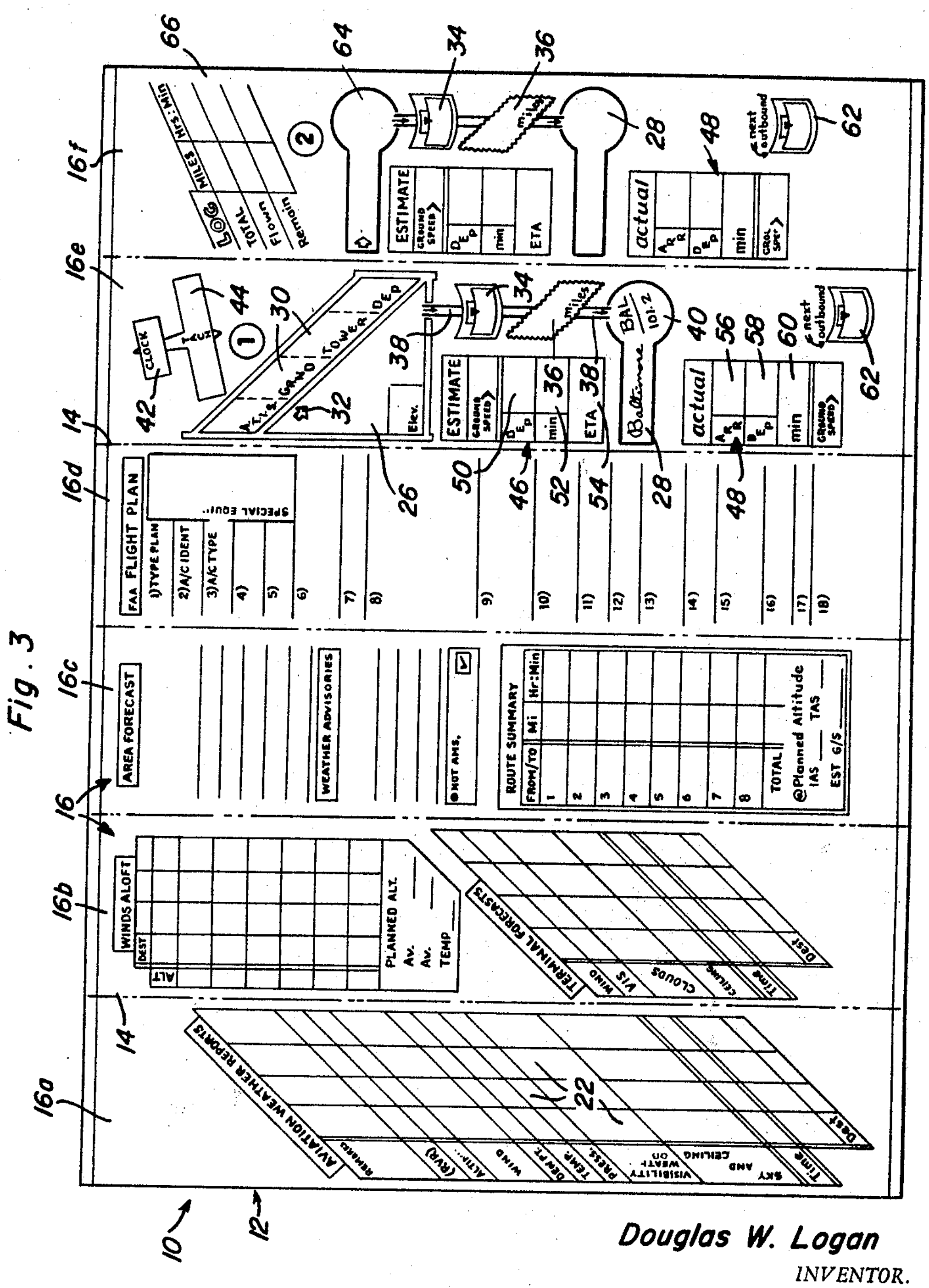
FIG. 3 is a plan view of the front face of an unfolded log in accordance with the instant invention.

Referring now specifically to FIG. 3, the front face of the log sheet 12 has ben illustrated in the completely unfolded position. From this figure in particular, it will be noted that each of the sections 16 is provided for the accommodation of specific information with this information being vertically disposed so as to facilitate both the recording and the reading thereof. The first two sections **16*a* and 16*b*, as well as the upper half of the third section 16*c* are utilized in the recording of aviation weather during flight. Of particular significance is the fact that each category is specifically set out from the other categories and clearly labelled, note for example the first section category "Aviation Weather Reports", and the two distinct categories "Winds Aloft" and "Terminal Forecasts" on section 16*b*. In this manner, the desired information can be immediately ascertained. It will be noted that at least two of the categories, "Aviation Weather Reports" and "Terminal Forecasts" are arranged with vertical columns and left to right upwardly inclined rows across said columns so as to define upwardly inclined or elongated information recording boxes 22. The formation of these information boxes 22 in this manner is deemend particularly significant in that, with the log 10 mounted on the instrument panel 18, as shown in FIG. 2, this being the most convenient position for the log 10 during the recordation of information in that the pilot is still free to retain the left hand on the control wheel 24, the information, as received, can be quickly and easily recorded. In actuality, using the right hand, the information at least in section 16a will be recorded from the bottom up, written either vertically or at an incluination following the greatest dimension of the recording boxes 22. This provision for a recordation of the information from the bottom up is deemed particularly significant in light of the normal vertical mounting of the log 10 on the instrument panel 18** for access thereto by the pilot while still utilizing one hand to control the aircraft, thereby avoiding any wandering from the proper heading, such as frequently happens when utilizing a conventional knee mounted log which requires one hand for recording the information and the second hand for holding a flashlight.

The second half of the third section **16*c*** will be provided with a box designated "Route Summary" and provides a brief vertically orientated summary of the entire flight distance and time. With this summary arranged vertically, it will be appreciated that the necessary addition can be effected normally as compared to the horizontal mathematics normally associated with the conventional pilot log.

The fourth section, **16*d***, will normally contain all of the information required on government FAA forms.

Figure 4:
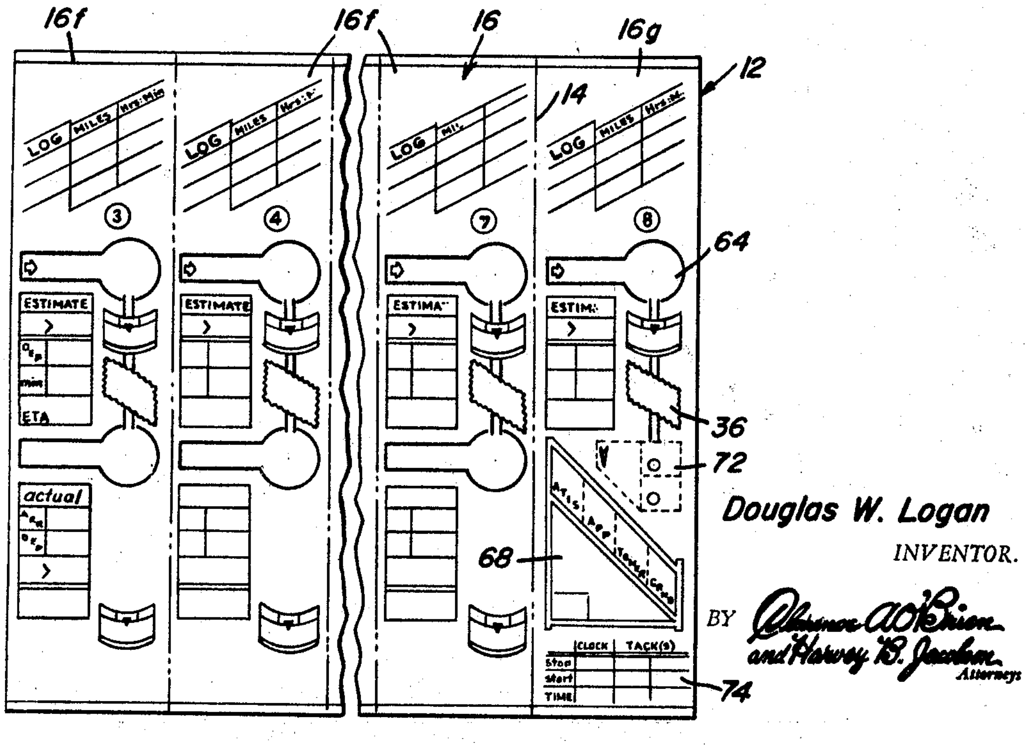
FIG. 4 is a rear plan view with the central sections removed.

Commencing with the fifth section **16*e*, each section is specifically set out so as to receive and display information relative to one leg of the trip. In this manner, through a folding of the sheet 12, the pilot can at all times have a visual representation of the current leg of the flight, along with the appropriate information, with this being the sole matter displayed, thereby avoiding any tendency for confusion to arise through the presence of additional material not actually required during the current leg. Section 16*e*, designated by a large numeral 1, constitutes a visual representation of the first leg of the flight with the subsequent sections 16*f* both on the front face of the sheet 12 and on the rear face of the sheet 12, noting FIG. 4, constituting visual representations of the intermediate legs of the flight, the final section 16*g*** being specifically related to the final leg of the flight.

Turning to section **16*e*, designating the initial leg of the flight, the major portion of the height of the section is taken up by an upper enclosed originating airport designating area 26, signifying the point of departure, and a vertically spaced lower check point designating area 28 signifying the first check point or fix. The upper enclosed area 26 simulates an actual airport with the take-off control systems 30 being designated along a simulated take-off path indicated by a small arrow 32. For example, individual boxes are provided for recording the information progressively received from the automatic terminal information service, the ground control, the tower control, and the departure control. This information will be recorded along a downwardly and forwardly inclined line signifying the departing movement of the aircraft. Located immediately below the simulated departure point on the area 26, this being along the right hand portion of the section 16*e*, is an area 34 wherein the compass heading is recorded. This area 34 is enclosed within a distinctive peripheral border which in most instances will simulate or schematically illustrate a compass. In this manner, there will be no question as to what the figure recorded in the area 34 signifies, nor will there be any difficulty in immediately picking out the heading recorded therein. By the same token, there will be no possibility of confusing this figure with any other figure which appears on the section 16*e***.

Immediately below the compass area 34, and in vertical alignment therewith, is the mileage designating area 36. This area 36 is also enclosed within a highly distinctive peripheral border, the border schematically indicating or suggesting a road sign or mileage indicating sign so as to likewise make the recorder or reader immediately aware of what the associated information indicates. It will be noted that clearly designated vertically extending channels 38 direct the viewer's attention to the vertically aligned areas 26, 34, 36 and 28, the lowermost channel 38 leading from the mileage area 36 into the vertically aligned circularly enlarged portion 40 provided on one end of the otherwise rectangular horizontally orientated check point area 28. This particular configuration of the check point area 28 is significant in that is provides sufficient room for a recording of, as an example, the name of the check point, the signal letters therefor, and the frequency upon which these letters will be received, all as illustratively set forth in FIG. 3.

Section **16*e* also includes, above the airport designating area 26, a schematic illustration of an airplane wherein the tail area 42 provides an area for the recordation of of the take-off time, while the wing area 44** provides an area for the indication of the tachometer reading or readings.

Further, separate single computation areas 46 and 48 are also provided. The area 46 is located to the left of the compass and mileage areas 34 and 36 and comprises an area for the figuring of the estimated time of arrival. As such, this area 46 basically includes an upper box 50 within which the departure time is recorded, and a lower box 52 wherein the estimated flying time to the next fix or check point is set forth, with the total being recorded immediately therebelow in a subjacent box 54 marked ETA or Estimated Time of Arrival. It will be appreciated that the necessary math is done vertically, thereby greatly facilitating this computation. Further, the necessary information and results are set forth in a self-contained area 46, thereby avoiding any possibility of confusion. The second computation area, located vertically below the lower check point area 28, is provided for a recording of the actual time in flight, and as such, includes an upper box 56 wherein the time of arrival is recorded and a lower box 58 wherein the departure time is recorded, the total arrived at through a substraction of the departure time from the arrival time being recorded in a subjacent box 60. As will be recognized, only a single computation is also involved with this area 48. Both areas 46 and 48 will also include a portion thereof wherein the ground speed can be indicated. Finally, the section **16*e* is provided with a second compass simulating heading designating enclosed area 62 located adjacent the bottom thereof. This particular area 62 is to have the heading for the next leg of the flight recorded therein whereby, upon an arrival of the check point, the new heading can be taken prior to or while the log sheet 12** is being folded to expose the next leg of the journey.

The intermediate sections **16*f* between the section 16*e* indicating the initial leg of the journey and the section 16*g* indicating the final leg, are duplicates of each other and differ from the above described section 16*e* in that, rather than the airport designating area 26, a check point area 64 is provided. The area 64 contains the same information as the lower check point designating area 28 on the previous section in that such constitutes the present location of the aircraft. One other difference resides in the provision of a third computation area 66 located above the upper check point 64. This area 66, designated LOG, is for recording the total mileage and total time of the flight, and, immediately therebelow, the miles and time flown which, when subtracted from the total leaves the remaining miles to be flown and hours of flight left, this being recorded immediately below the vertically aligned total miles and time and flown miles and time. The individual boxes for this computation area 66 are inclined upwardly at an angle from left to right so as to facilitate the recording of the information therein during flight. All of the intermediate sections 16*f***, any reasonable number of which may actually be provided, are duplicates of each other with the required information being brought forward as each leg of the flight is gone into.

The final section **16*g* which is used on the final leg of the flight differs from the adjacent intermediate sections 16*f* in that the lower check point designating area is replaced by an airport simulating area 68 designating the airport at which the flight is terminated. This airport designating area is provided with progressively approached angularly orientated information boxes for recording information received from the automatic terminal system, the approach control, the tower control, and the ground control in that order. Furthermore, immediately below the mileage designating area 36 and in vertical alignment therewith, is a separate area 72 set out for a recording of the information necessary for an instrument approach, such information including the frequencies used in the instrument landing system. Further, the actual time computation area 48 associated with sections 16*e* and 16*f* is replaced in section 16*g* by a computation area 74 wherein both the stop and start times of the clock and tachometers are recorded, as well as the total or difference therebetween so as to provide a final reading. This computation area 74 is also of course arranged for vertical computation and is independent of the two other computation areas associated with the section 16*g***.

From the foregoing, it will be appreciated that a unique pilot's or flight log has been devised, this log enabling the application of what might be called vertically mathematics or a vertical system of navigation, as compared to the troublesome horizontal system now required by conventional logs. The construction of the log in a manner so as to provide a plurality of vertically elongated equal size sections which can be so arranged as to selectively expose any one face of the sections results in the provision of a log which is compact, easily carried or mounted on an instrument panel, and which enables the selective exposure of only that information with which the pilot is concerned at any one particular time. In other words, all of the information necessary for a particular leg of a flight can be simultaneously exposed without a corresponding exposure of information relating to the other legs, thereby avoiding any confusion or misreading of the information. In conjunction with this avoiding of confusion, specific means is provided for immediately indicating the nature of the recorded information, wherether it be a compass heading or a mileage indication, all of the necessary computations being effected independent of each other and in a vertical manner.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A flight log comprising a rectangular sheet, said sheet having a plurality of parallel fold lines extending transversely thereacross at equally spaced points therealong so as to divide said sheet into integrally joined adjacent parallel rectangular sections, said fold lines defining flexible hinge means enabling the folding of each section into an overlying position with either face of the adjacent section, said hinge means, in each instance, enabling the accommodation of any number of the sections between the adjacent overlying sections whereby a selective upward exposure of either face of any section can be effected, said sections being of a width whereby when the sheet is folded to expose only a single section, the log can be held in one hand for the recordation of information thereon by means of a writing instrument held in the other hand, a majority of said sections each corresponding a a single leg of a flight, each flight leg section comprising vertically spaced check point designating areas, the upper of said areas constituting the originating check point for the leg, the lower of said check point designating areas constituting the terminating check point for the leg, a compass heading area located between said check point areas, and a mileage area also located between said check point areas, at least one of said sections other than a flight leg section including, as a major portion thereof, an area for recording weather during flight, said weather recording area compising vetical columns and left to ight upwardly inclined rows across said columns defining upwardly inclined information recording boxes for the recordation of information therein by one sitting generally forward of a vertically mounted log exposing said weather recording area.

References Cited

UNITED STATES PATENTS

| | | | |
|---|---|---|---|
| 1,199,461 | -0/1916 | Chase | 43—62 |
| 2,179,172 | 11/1939 | Bonnaire | 43—62 |

FOREIGN PATENTS

| | | |
|---|---|---|
| 692,161 | 7/1930 | France. |

LAWRENCE CHARLES, *Primary Examiner.*